J. GERAGHTY.
Terret and Martingale Rings.
No. 141,502. Patented August 5, 1873.
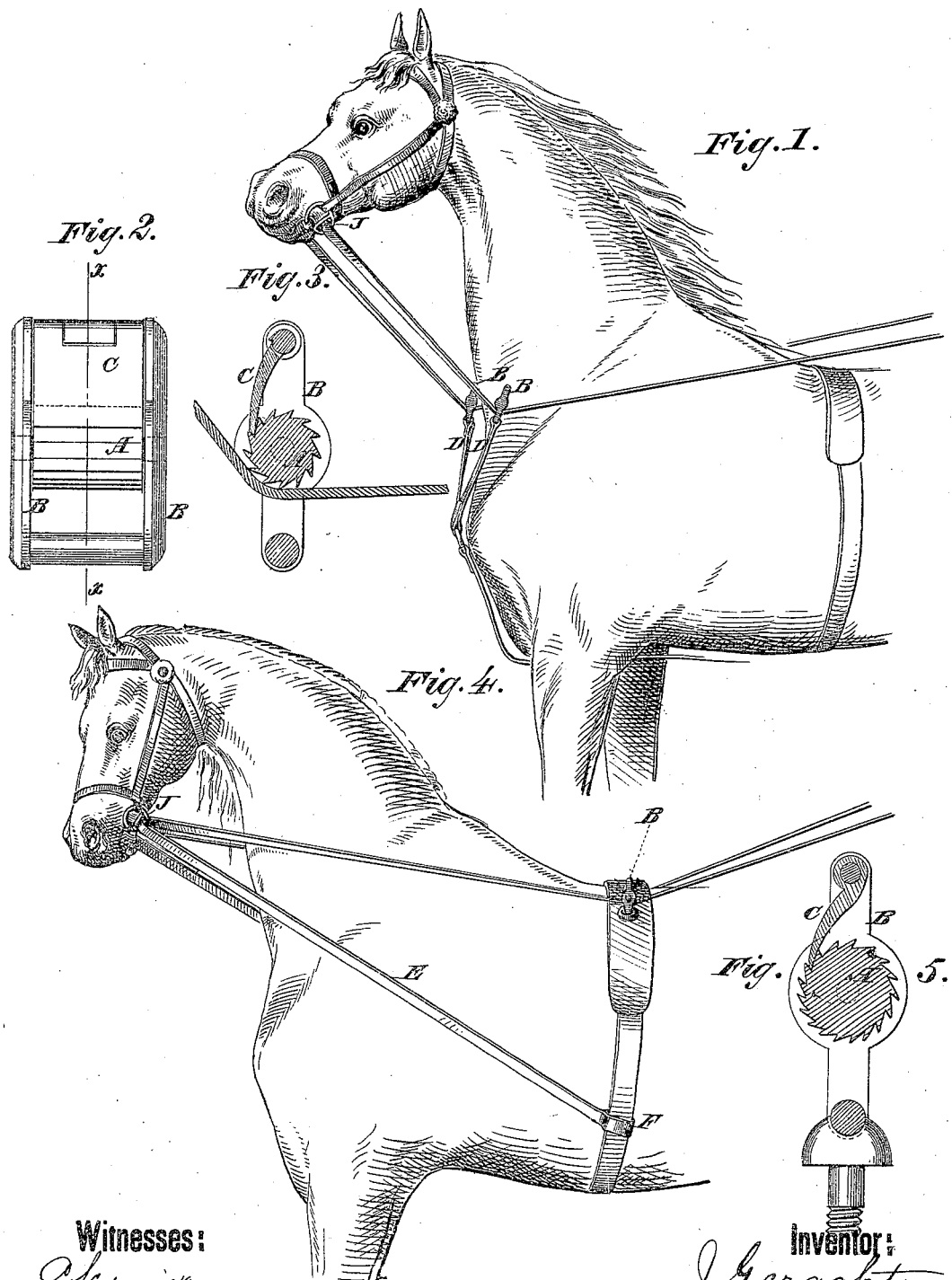

UNITED STATES PATENT OFFICE.

JOHN GERAGHTY, OF JERSEY CITY, NEW JERSEY.

IMPROVEMENT IN TERRET AND MARTINGALE RINGS.

Specification forming part of Letters Patent No. 141,502, dated August 5, 1873; application filed April 19, 1873.

*To all whom it may concern:*

Be it known that I, JOHN GERAGHTY, of Jersey City, in the county of Hudson and State of New Jersey, have invented a new and Improved Check-Rein, of which the following is a specification:

My invention consists of a fluted roller and pawl to be used in the terrets and martingales in substitution of the ordinary check-rein rings for guiding and controlling the reins; also, for aiding the driver in controlling the horse by turning freely with the rein when pulled backward by the driver, but not turning in the other direction, so that when the horse gets advantage of the driver he must also overcome the friction of the reins on the rollers; but when the driver has the advantage, so as to pull the reins in his direction, he has not to contend with the friction, as the horse has, and thus has a constant element of advantage.

Figure 1 is a picture of a horse whose martingales are provided with my improved check-rein roller. Fig. 2 is a front elevation of the roller. Fig. 3 is a section of Fig. 2 on the line *x x*. Fig. 4 is a picture of a horse whose harness is provided with my check-rein rollers in the terrets; and Fig. 5 is a sectional elevation of a terret with a check-rein roller, such as I propose to make.

Similar letters of reference indicate corresponding parts.

I arrange a grooved or fluted roller, A, in a frame, B, somewhat similar to the frame of a buckle, with a pawl, C, arranged to allow the roller to turn freely in one direction, but to prevent it from turning in the other one. I attach such frames to the martingales D in place of the ordinary rein-rings, and pass the reins through them, as shown in Fig. 1, or in some cases I attach them to the terrets, as in Fig. 4, so that the rollers will turn when the reins are pulled back, and save the driver the labor of pulling against the friction also, which is very great when the horse pulls hard, but so that the rollers will not turn in the other direction, and thus compel the horse to pull against the friction as well as the driver, which gives to the latter a material advantage.

I also propose, in the case of driving-reins, to have them pass through the bit-ring J and back to the surcingle, as shown at E, as a further means of increasing the control of the horse by the driver. A little roller will be used in the bit-ring to avoid friction thereat. This arrangement gives the driver nearly double the power over the horse.

When I use this extension of the reins to the girdle I will have them connected by a loop, F, so fitted that it can be shifted low down for a horse who carries his head too high, and high up for one whose carriage is too low, so as to influence them by the direction of the strain of the reins as much as possible.

The pawls may have a spring to keep them in contact with the rollers.

Having thus described my invention, I claim as new and desire to secure by Letters Patent—

An improved harness-trimming for martingale and terret rings, consisting of the frame B, ratchet A, and pawl C, combined and arranged as and for the purpose specified.

JOHN GERAGHTY.

Witnesses:
    A. P. THAYER,
    T. B. MOSHER.